Patented July 3, 1928.

1,675,500

UNITED STATES PATENT OFFICE.

WALTER KROPP, OF ELBERFELD, GERMANY, ASSIGNOR TO WINTHROP CHEMICAL COMPANY, INC., OF NEW YORK, N. Y.

PHARMACEUTICAL COMPOUND.

No Drawing. Application filed September 17, 1925, Serial No. 57,026, and in Germany December 12, 1924.

My invention concerns the production of the hitherto unknown hydroxyalkylamides of orthohydroxyaryl carboxylic acids having most probably the following general formula:

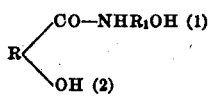

in which $R_1$ stands for an alkylene containing more than one carbon atom such as —$CH_2$—$CH_2$— etc., and R stands for an aryl radicle e. g.

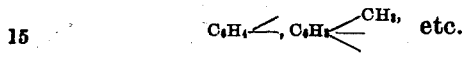

The new bodies are whitish crystalline products which are soluble with difficulty in water. They have proved to be valuable antirheumatics and antineuralgics and may be obtained for instance by converting the orthohydroxybenzoic acids or their derivatives by the usual methods into the hydroxyalkylamides, e. g. by treating their esters or halides with aminoaliphatic alcohols.

In order to illustrate the new process more fully the following example is given, the parts being by weight:

75 parts of salicylic acid methyl ester are heated to 180° C. together with 31 parts of aminoethanol in a distilling vessel provided with a condenser until all of the methyl alcohol has gone over. To remove the small quantity of the unchanged ester the mass is treated with steam. The new compound crystallizes from water. It is a whitish product melting at 119° C. Its solution is colored violet by a ferric chloride solution. It is easily soluble in alcohol and soluble with more difficulty in ether and has most probably the following formula:

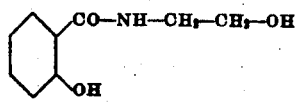

The product obtained from meta-cresotinic acid methyl ester and aminoethanol crystallizes from benzene in crystals melting at 88° C. It has most probably the formula:

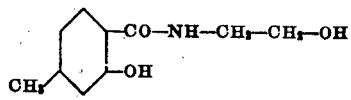

I claim:

1. The herein-described new hydroxyalkylamides of orthohydroxyarylcarboxylic acids having most probably the formula:

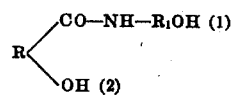

wherein R stands for an aryl and $R_1$ for an alkylene with more than one carbon atom, which are generally whitish crystalline compounds being soluble with difficulty in water and being valuable antirheumatics and antineuralgics, substantially as described.

2. The herein-described hydroxyethylamide of orthohydroxybenzoic acid having most probably the formula:

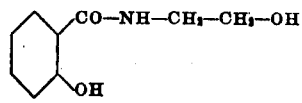

which crystallizes from water in the form of whitish crystals melting at 119° C., being easily soluble in alcohol, its aqueous solution being colored violet by a ferric chloride solution, and being a valuable antirheumatic and antineuralgic, substantially as described.

In testimony whereof I have hereunto set my hand.

WALTER KROPP.